March 26, 1968 W. C. RUTTENBERG ET AL 3,375,154
TIRE BUILDING DRUM
Filed April 9, 1965 3 Sheets-Sheet 1
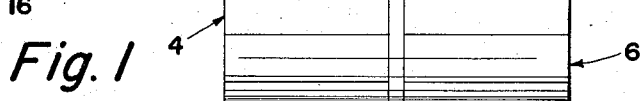
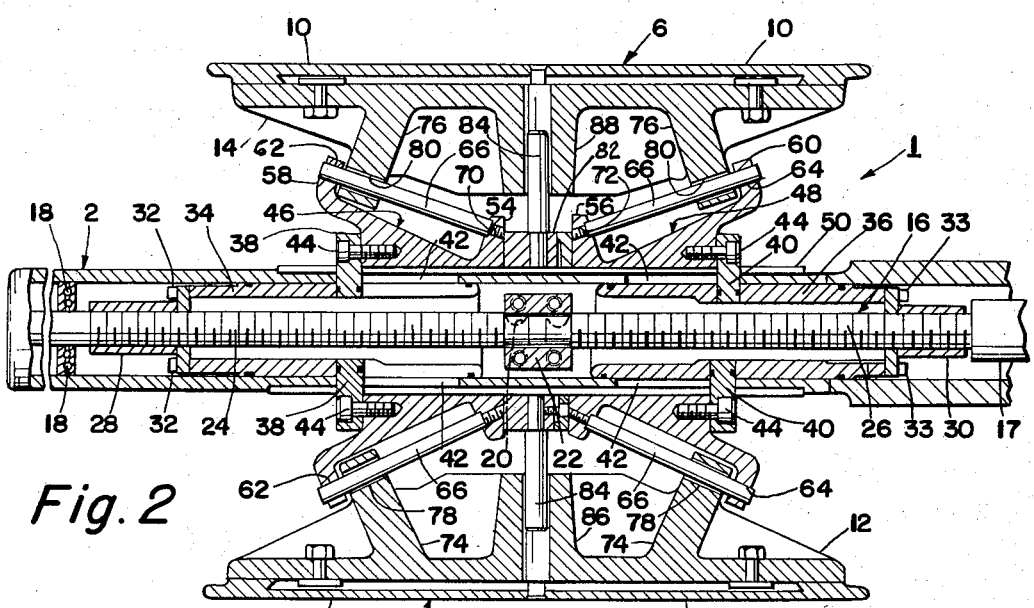
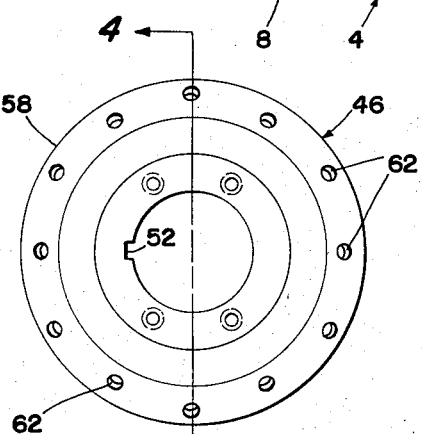
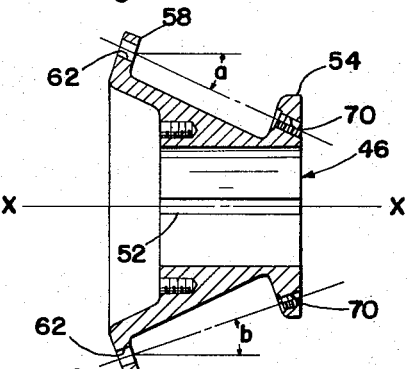
INVENTORS
WILLIAM C. RUTTENBERG
WOODROW TEATER
BY
ATTORNEYS March 26, 1968    W. C. RUTTENBERG ET AL    3,375,154
TIRE BUILDING DRUM Filed April 9, 1965    3 Sheets-Sheet 2

INVENTORS
WILLIAM C. RUTTENBERG
BY WOODROW TEATER

Teare, Tetzer & Teare
ATTORNEYS

March 26, 1968  W. C. RUTTENBERG ET AL  3,375,154

TIRE BUILDING DRUM

Filed April 9, 1965  3 Sheets-Sheet 3

INVENTORS
WILLIAM C. RUTTENBERG
BY WOODROW TEATER

*Teare, Fetzer & Teare*

ATTORNEYS

United States Patent Office 3,375,154
Patented Mar. 26, 1968

3,375,154
TIRE BUILDING DRUM
William C. Ruttenberg, Stow, and Woodrow Teater, Barberton, Ohio, assignors to The Akron Standard Mold Company, Akron, Ohio, a corporation of Ohio
Filed Apr. 9, 1965, Ser. No. 446,924
15 Claims. (Cl. 156—418)

This invention relates to tire building drums, and more particularly relates to an improved construction for a radially expansible and collapsible tire building drum for building vehicle tires or the like.

In general, tire casings are made by assembly of the component parts, such as the carcass plies, bead rings, and tread in the form of a flat band on the surface of a rotatable tire building drum. The drum is mounted for rotation about its longitudinal central axis and generally includes a plurality of annular drum segments which engageably coact to provide an uninterrupted tire building surface. The drum segments are preferably arranged for expansive movement into an operative position for building the tire band thereon, and for collapsible movement so as to reduce the drum diameter to enable the finished band to be removed from the drum for subsequent vulcanizing operations thereon.

Heretofore, various types of arrangements have been employed for expanding and collapsing the drum segments. In some instances complex hinge and/or linkage mechanism have been employed which are not only expensive to produce and maintain, but are inefficient in operation and cannot be controlled with a high degree of precision, particularly after extended usage. Any such imprecision in the collapsing and expanding movements of the drum segments causes spaces or gaps to be formed between the segments which results in consequent distortion and/or damage to the finished tire band. Furthermore, such mechanisms are bulky and space consuming in construction and, therefore, cannot be efficiently employed within the limited space available interiorly of the tire building drum. In other instances, various cam and cam follower arrangements have been employed which though precise in operation are generally expensive to produce due to the tooling costs and intricate machining operations attendant in the production thereof. Hence, such arrangements are not only expensive from an initial construction standpoint, but are expensive to maintain and/or repair after extended usage.

Accordingly, an object of the present invention is to provide an improved construction for a tire building drum which may be radially collapsed and expanded without distortion and/or damage to a tire band formed thereon.

Another object of the present invention is to provide a tire building drum of the character described which includes a plurality of generally arcuate drum segments arranged to provide an uninterrupted tire building surface, and which incorporates an improved construction of a mechanism for radially expanding and collapsing the drum segments without distortion and/or damage to the tire band formed thereon.

A further object of the present invention is to provide a mechanism of the character described which is of a simple, yet durable construction for precision radial expanding and collapsing movements of the drum segments.

A still further object of the present invention is to provide a mechanism of the character described which is economical to produce, and which may be maintained and/or repaired with a minimum amount of time and effort.

A still further object of the present invention is to provide a mechanism of the character described which is of a high strength, compact construction, and which includes component parts which may be readily assembled and disassembled with a minimum cost and effort, and by relatively unskilled labor.

Further objects and advantages, and other new and useful features in the construction, arrangements and general combination of the components for providing a radial expansive and collapsible tire building drum will be apparent to those skilled in the art, as the following description proceeds, with reference to the accompanying drawings, for purposes of illustration, but not of limitation, in which like reference characters designate like parts throughout, wherein:

FIG. 1 is a fragmentary top plane view of a tire building drum made in accordance with the present invention, showing the drum in the expanded position and mounted on a rotatable power-quill;

FIG. 2 is an enlarged fragmentary section view taken along the line 2—2 of FIG. 5;

FIG. 3 is an end view of one of the cone members removed from the assembly of FIG. 2;

FIG. 4 is a vertical section view taken along the line 4—4 of FIG. 3;

Figure 5:
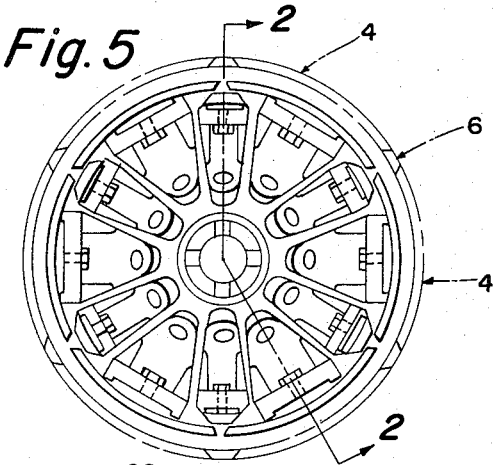
FIG. 5 is an end view on a slightly enlarged scale of the drum of FIG. 1 rotated 45°, and showing the segment assemblies in a collapsed position, by solid lines, and in the expanded position, by broken lines.
Figure 7:
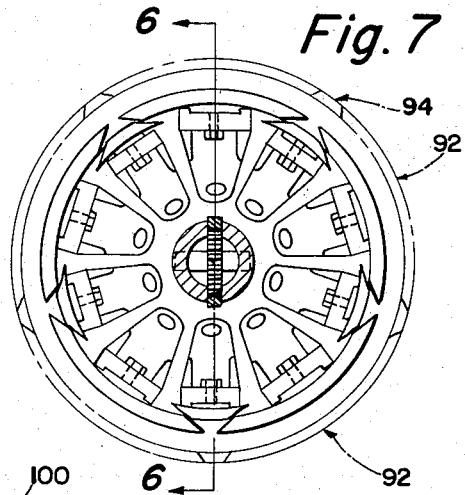
FIG. 7 is an end view on a reduced scale of the tire building drum shown in FIG. 6, and showing the segment assemblies in a collapsed position, by solid lines, and in the expanded position, by broken lines.

Generally, and with reference to FIGS. 1 and 2 of the drawings, the present invention in one form includes a radially collapsible drum 1 supported for rotation about its longitudinal axis by means of a power-quill 2. The drum 1 comprises two sets of segment assemblies, namely, a larger set 4 and a smaller set 6 disposed intermediate and alternately with respect to the larger set 4 to provide a continuous tire building surface in the expanded position of the drum (FIG. 2). The segment assemblies 4 and 6, respectively may each comprise a pair of oppositely disposed, generally arcuate wing members 8 and 10 which are mounted for axial movement on a base or segment supporting members 12 and 14 to provide for axial width-wise adjustment of the tire building surface. In accordance with the invention, a novel drive cone arrangement is constructed and arranged for moving the smaller segment assemblies 6 radially in advance of the larger segment assemblies 4 upon collapsing of the drum, and for moving the larger segment assemblies 4 radially in advance of the smaller segment assemblies 6 upon expanding of the drum, as will hereinafter be more fully described.

Referring then to the drawings and in particular to FIGS. 2 to 5 thereof, the power-quill 2 is preferably connected at one end to a source of power for rotating the drum 1 (not shown), such as a fluid type motor conventionally employed in tire building apparatus. The quill 2 is preferably of an elongated, cylindrical construction which serves to house a drive assembly.

The drive assembly, includes an elongated drive screw 16 which may be connected at one end to another power source 17 for rotation about its longitudinal central axis and may be journaled at its other end, as at 18, for free turning movement interiorly of the quill 2. The drive screw 16 may be journaled, as at 20, generally intermediate its ends by a bearing sleeve 22 mounted stationary interiorly of the quill 2 so as to distribute the torque forces upon turning movement of the screw 16. The screw 16 is preferably oppositely threaded on either side of the bearing sleeve 22, as at 24 and 26, for threaded engagement with a pair of oppositely disposed threaded nuts 28 and 30. The nuts 28 and 30 are preferably of an elongated, cylindrical cap-like construction which are attached adjacent the cap end, such as by bolts 32 and 33, to a pair of cylindrical drive sleeves 34 and 36 which are laterally spaced on either side of the bearing sleeve 22. The drive sleeves 34 and 36 are preferably of a lesser transverse dimension compared to the transverse dimension of the quill 2 so as to be slideably, yet snugly disposed for axial movement within the quill 2 upon turning movement of the screw 16 therein. The respective drive sleeves 34 and 36 are each provided with a plurality of radially extending lugs 38 and 40 which extend outwardly through a plurality of circumferentially spaced and axially aligned slots 42 provided in the quill 2 for attachment, such as by bolts 44, to a cone assembly mounted on the quill 2.

As shown, the cone assembly includes a pair of oppositely disposed outboard 46 and inboard 48 cone members disposed for axial movement on the quill 2 by means of a key 50 provided on the quill slideably engaged within key-way slots 52 provided on each of the respective cone members. In this form, the cone members 46 and 48 are preferably of identical construction and are generally of a frusto-conical configuration; each of which includes a relatively smaller annular flange 54 and 56 adjacent one end disposed generally normal to the longitudinal axis of the quill 2, and a relatively larger annular flange 58 and 60 adjacent the other end and disposed at an oblique angle relative to the longitudinal axis of the quill 2. The larger flanges 58 and 60 are provided adjacent their marginal edges with a plurality of circumferentially spaced apertures 62 and 64 which are adapted to slideably receive therethrough a plurality of pins 66. The pins 66 are preferably of an elongated, cylindrical construction and are adapted to be threadably attached at one end, into a plurality of threaded sockets 70 and 72 provided adjacent the outer marginal edge of the flanges 54 and 56 in the respective cone members. The threaded sockets 70 and 72 of the flanges 54 and 56 are preferably in axial paired alignment with the apertures 62 and 64 in the flanges 58 and 60, but alternate pairs of apertures and sockets, respectively, are disposed at a different angle from the remaining pairs of apertures and sockets so as to mount alternate of the pins 66 at a different angle from the remaining pins relative to the longitudinal central axis of the quill 2. Moreover, and as best illustrated in FIG. 4, the included angle $a$ defined by a line passing through the centers of alternate pairs of apertures and sockets, respectively, and a line parallel to the longitudinal central axis X—X of the quill may be about 25° while the included angle $b$ provided by the remaining pairs of apertures and sockets respectively, may be about 18° 25′. This relative angular relationship, however, may vary in each case dependent upon the size of drum for a particular tire building operation.

The circumferentially spaced and angularly disposed pins 66 serve to mount the respective segment assemblies for radial collapsing and expanding movement of the drum upon axial movement of the cone members on the quill 2. Such mounting is preferably accomplished by means of a pair of oppositely disposed arms 74 and 76 which depend inwardly and angularly outwardly from the larger 4 and smaller 6 segment assemblies, respectively. The arms 74 and 76 are provided adjacent their free ends with inclined passageways 78 and 80 which are adapted to slideably, yet snugly receive therethrough the pins 66 mounted on the respective cone members. Thus, for each larger 4 and smaller 6 segment assembly, there is provided a pair of angularly but oppositely disposed pins 66 with the pins of the larger segment assemblies being disposed at a relatively lesser angle compared to the pins of the smaller segment assemblies 6, so that the smaller segment assemblies are moved radially in advance before movement of the larger segment assemblies, which are thereafter drawn together and over the smaller segment assemblies in the collapsed position of the drum, as shown by full lines in FIG. 5. This initial movement of the smaller segment assemblies 6 effectively breaks the adhesive force between the tacky tire carcass and the drum, thereby eliminating the need for heavy and complicated collapsing equipment heretofore employed in collapsing the drum, while at the same time providing a smooth continuous tire building surface that is free of spaces in the expanded position of the drum as shown in broken line of FIG. 5. Though twelve pins 66 have been mounted on each of the respective cone members, the number of pins may vary in each case dependent upon the number of segment assemblies required to complete the tire building surface for a given size and application of the tire building drum.

To prevent lateral shifting movement of the segment assemblies, and to maintain precision radial collapsing and expansive movement of the segment assemblies there may be provided a telescoping guide assembly, mounted on the quill 2. As shown, the guide assembly includes an annular hub 82 mounted centrally of and stationary on the quill 2 intermediate the cone members 46 and 48. The hub 82 may be provided with a plurality of radially extending guide studs 84 which are adapted to be slideably received adjacent their free ends within corresponding guide sleeve 86 and 88 that extend inwardly from each of the larger 4 and smaller 6 segment assemblies, respectively.

In operation, the segment assemblies can be readily collapsed and expanded, simply by actuation of the drive screw 16. Since the screw is oppositely threaded, as at 24 and 26, turning movement of the screw in one direction is transmitted through the threaded nuts 28 and 30 to the respective cone members 46 and 48 via the drive sleeves 34 and 36 for moving the cone members axially toward one another, while turning movement of the screw 16 in the opposite direction moves the cone members away from one another. Axial movement of the cone members 46 and 48 toward one another causes the arms 74 and 76 of the larger 4 and smaller 6 segment assemblies, respectively, to "ride-up" on the associated pins 66 until the cone members are locked against further axial movement against the centrally disposed hub 82, whereupon, the segment assemblies are held in the fully expanded position, as shown in FIG. 2 and in broken line in FIG. 5. Conversely, axial movement of the cone members 46 and 48 away from one another causes the arms 74 and 76 of the larger 4 and smaller 6 segment assemblies, respectively, to "ride-down" on the associated pins 66 to bring the segment assemblies into the completely collapsed position, as shown in full line of FIG. 5.

Moreover, it can be seen that the angular disposition of the associated pins 66 mounting the larger segment assemblies 4 differs from that of the associated pins 66 mounting the smaller segment assemblies 6, such that the latter move radially inwardly at a faster rate than the former, that is, the smaller segment assemblies 6 are caused to move inwardly and out of the path of the larger segment assemblies 4 upon radial inward movement of the segment assemblies into the collapsed position of the drum. Such collapsing movement of the segment assemblies in the manner described provides sufficient clearance for removal of the tire carcass from the drum, whereupon, the operation may be reversed and the drum expanded for another cycle of operation.

In FIGS. 6 to 13 there is shown a modification of the tire building drum, designated generally at 90, which is generally similar in operation to that shown in FIGS. 1 to 5, including a set of larger segment assemblies 92 and an alternately disposed set of smaller segment assemblies 94 mounted for rotation about a longitudinal central axis by means of a power-quill 96. The larger segment assemblies 92 each include a pair of oppositely disposed generally arcuate wing members 98 and 100 mounted for axial width-wise adjustment on a segment support member 102, and the smaller segment assemblies 94 each include a pair of oppositely disposed, generally arcuate wing members 104 and 106 mounted for width-wise adjustment on a segment support member 108.

In this form, however, the drive cone assembly includes a generally cylindrical sleeve 110 mounted stationary within the quill 96. A pair of laterally spaced, annular pinion gears 112 and 114 are journaled in tandem alignment for free rotation within the sleeve 110 on stub axles 116 and 118 attached to the interior of the sleeve 110. The pinion gears 112 and 114 are preferably of a diameter so as to extend radially outwardly adjacent one side thereof through corresponding pairs of oppositely disposed slots 120 and 122 provided in the sleeve 110 for meshing coacting engagement with an upper 124 and lower 126 toothed racks, respectively.

Figure 8:
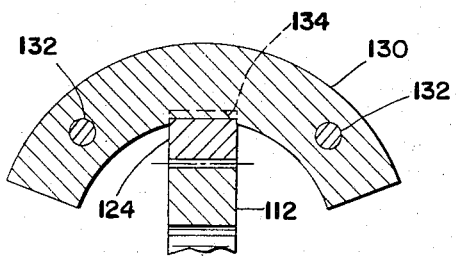
FIG. 8 is a vertical section view taken along the line 8—8 of FIG. 6.
Figure 9:
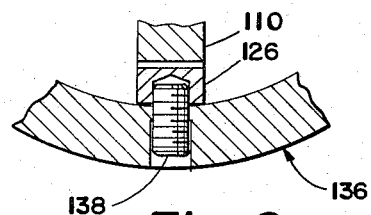
FIG. 9 is a vertical section view taken along the line 9—9 of FIG. 6.
Figure 10:
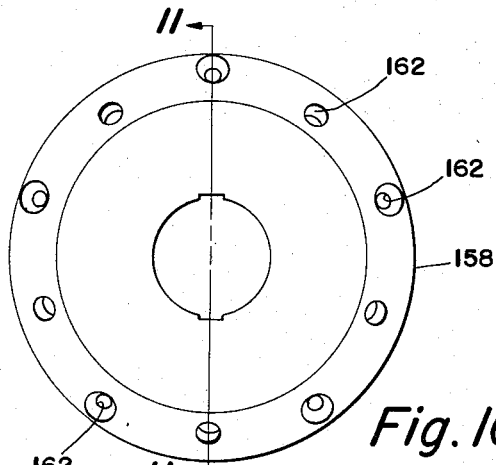
FIG. 10 is an end view of the inboard cone member removed from the assembly of FIG. 6.
Figure 12:
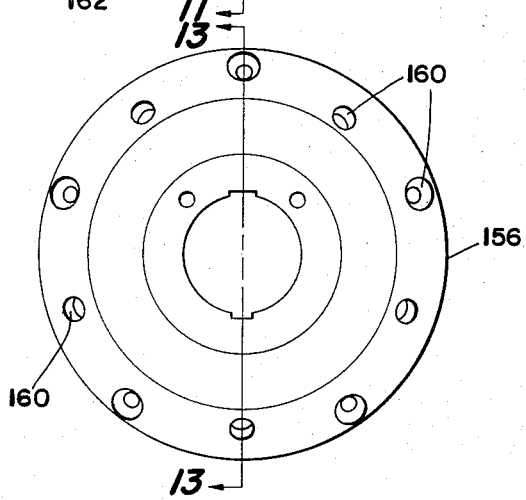
FIG. 12 is an end view of the outboard cone member removed from the assembly of FIG. 6.
Figure 11:
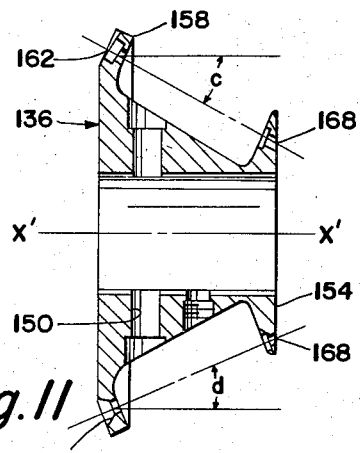
FIG. 11 is a vertical section view taken along the line 11—11 of FIG. 10.
Figure 13:
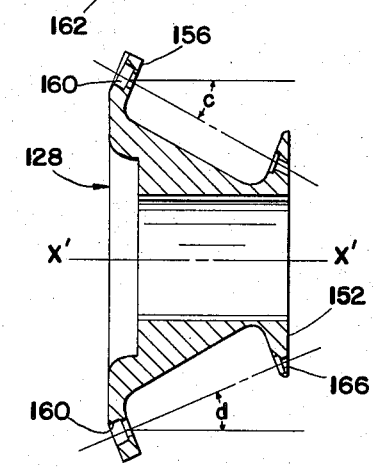
FIG. 13 is a vertical section view taken along the line 13—13 of FIG. 12.

The racks 124 and 126 are preferably of a flat, elongated construction having a toothed length sufficient to provide the desired collapsing and expanding movement of the segment assemblies. The upper rack 124 is attached at one end only to the outboard cone member 128 by means of a generally arcuate bracket plate 130 (FIG. 8). The plate 130 is attached, such as by bolts 132, to the outboard cone member 128 and fitted within an arcuate recessed slot 134 provided adjacent the outer end of the upper rack 124, thereby to connect the latter to the cone member 128. The lower rack 126 is attached only at one end to the inboard cone member 136 (FIG. 9) by means of a fastener 138, such as a set screw. By this arrangement, diagonally opposed ends of the respective racks are unattached for free sliding movement relative to the associated cone members.

In this form, the inboard cone member 136 serves as a drive cone and is attached as at 144 to one end of a reciprocable drive member 140, such as a double-acting fluid piston, disposed for axial movement within the sleeve 110 and connected at its other end to a source of power (not shown). The drive member 140 is connected to the inboard cone member 136 by means of a generally vertically extending rod 142 which extends through a pair of oppositely disposed apertures 146 provided in the sleeve 110 and through a corresponding pair of oppositely disposed, axially extending slots 148 provided in the quill 196. The free ends of the rod 142 are disposed within apertures 150 provided in the cone member 128 (FIG. 11), whereby axial movement of the drive member 140 is transmitted via the rod 142 so as to move the cone member 136 axially relative to the quill 96.

The inboard 136 and outboard 128 cone members are preferably of a generally frusto-conical configuration; each of which includes a relative smaller annular flange 152 and 154 adjacent one end thereof and disposed generally normal to the longitudinal axis of the quill 96, and a relatively larger annular flange 156 and 158 adjacent the other end thereof and disposed at an oblique angle relative to the longitudinal central axis of the quill 96. Here again, the larger flanges 156 and 158 are provided adjacent their marginal edges with a plurality of circumferentially spaced apertures 160 and 162 which are adapted to slideably receive therethrough a plurality of pins 164 of the type heretofore described. The pins 164 are adapted to be threadably attached at one end into thread sockets 166 and 168 provided adjacent the outer marginal edge of the respective smaller flanges 152 and 154. The threaded sockets 166 and 168 are preferably in axial paired alignment with corresponding of the apertures 160 and 162 provided in the respective larger flanges 156 and 158, but alternate pairs of the apertures and sockets, respectively, are disposed at a different angle from the remaining pairs of apertures and sockets, respectively, so as to mount alternate of the pins 164 at a different angle from the remaining pins relative to the longitudinal central axis of the quill 96, as aforesaid. Moreover, in this form it is preferred that the included angle $c$ defined by a line passing through the centers of alternate pairs of apertures and sockets, respectively, and a line parallel to the longitudinal central axis X'—X' of the quill 96 be about 30°, while the included angle $d$ provided by the remaining pairs of apertures and sockets, respectively, be about 22° 22'.

Mounting of the respective segment assemblies 92 and 94 on the circumferentially spaced and angularly disposed pins 164 is similarly accomplished by means of a pair of oppositely disposed arms 170 and 172 which depend inwardly and angularly outwardly from the larger 92 and smaller 94 assemblies, respectively. The arms 170 and 172 are similarly provided adjacent their free ends with inclined passageways 174 and 176 which are adapted to slideably, yet snugly receive therethrough the pins 164 mounted on the respective cone members 128 and 136, as aforesaid.

To prevent lateral shifting movement of the segment assemblies and to maintain precision radial collapsing and expanding movement of the segment assemblies there may be provided a similar type telescoping guide assembly, as that described in FIGS. 1 to 5. As shown, the guide assembly includes an annular hub 178 mounted centrally of and stationary on the quill 96 intermediate the respective cone members 128 and 136. The hub 178 may similarly be provided with a plurality of radially extending guide studs 180 which are adapted to be slideably received adjacent their free ends in corresponding guide sleeves 182 and 184 provided in the segment support members 102 and 108, respectively.

Figure 6:
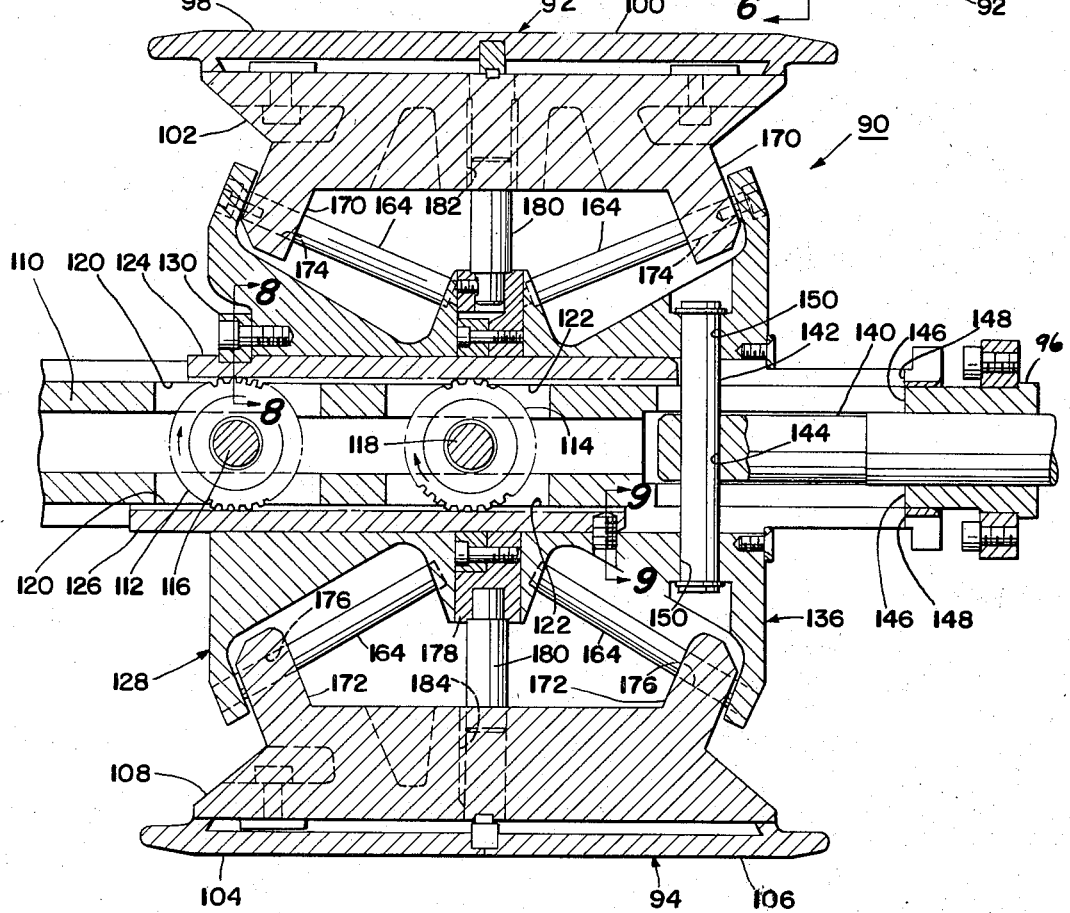
FIG. 6 is an enlarged fragmentary section view taken along the plane of line 6—6 of FIG. 7 and showing a modification of the tire building drum made in accordance with the present invention.

In this form, radial collapsing and expanding movement of the segment assemblies 92 and 94 is accomplished by actuation of the drive member 140. Moreover, since the drive member 140 is connected to the inboard cone 136 via bolt 142 inward movement of the drive member 140 to the left, for instance, causes axial movement of the inboard cone member 136 in the same direction relative to the quill 96. Since the inboard cone member 136 is attached to only one end of the lower rack 126, and since the outboard cone member 128 is attached to only one end of the upper rack 124, such inward movement of the inboard cone member 136 moves the lower rack 126 axially in the same direction which causes the pinion gears 112 and 114 to rotate in a clockwise direction, as viewed in FIG. 6. Rotational movement of the pinion gears 112 and 114 in a clockwise direction, therefore, moves the upper rack 124 in the opposite direction relative to movement of the lower rack 126, whereby the inboard 136 and outboard cone members 128 are moved axially toward one another. This axial movement of the cone members toward one another causes the arms 170 and 172 of the respective segment assemblies to "ride-up" on the associated pins 164 until the cone members are locked against further axial movement against the hub 178, whereupon the segment assemblies are held in the fully expanded position, as shown in FIG. 6 and in broken line in FIG. 7. Conversely, outward movement of the drive member 140 to the right causes the pinion gears 112 and 114 to rotate in the opposite or counterclockwise direction, thereby to move the cone members 128 and 136 via the upper 124 and lower 126 racks axially away from one another. Such axial movement of the cone members away from one another causes the arms 170 and 172 of the larger 92 and smaller 94 segment assemblies to "ride-down" on the associated pins 164 to bring the segment assemblies into the completely collapsed position, as shown in solid lines in FIG. 7.

We have shown and described what is considered to be the preferred embodiments of the present invention, together with suggested modified forms, and it will be obvious to those skilled in the art that other changes may be made without departing from the scope of the present invention as defined by the appended claims.

We claim:

1. A collapsible tire building drum comprising, a plurality of segment assemblies arranged to form a continuous tire building surface, a shaft spaced within said segment assemblies and adapted for rotating said drum, a cone member mounted on and adapted for axial movement relative to said shaft, a plurality of angularly disposed pin means mounted on and in circumferentially spaced relationship around said cone member, said segment assemblies being slideably mounted on said pin means for radial collapsing and expanding movement of said segment assemblies upon axial movement of said cone member relative said shaft.

2. A collapsible tire building drum in accordance with claim 1, including a threaded screw means mounted for turning movement within said shaft, and nut means mounted for threaded movement on said screw means and operably connected to said cone member for moving the latter axially of said shaft upon turning movement of said screw means.

3. A collapsible tire building drum in accordance with claim 1, wherein alternate of said pin means are disposed at an angle different from the other of said pin means for moving certain of said segment assemblies radially in advance of other of said segment assemblies upon collapsing of the drum, and for moving said others of the segment assemblies radially in advance of the first mentioned segment assemblies upon expanding of the drum.

4. A collapsible tire building drum comprising, a plurality of segment assemblies arranged to form a continuous tire building surface, each of said segment assemblies including a support member having an oppositely disposed pair of inclined passageway means extending therethrough, a shaft spaced within said segment assemblies and adapted for rotating said drum, a pair of spaced, oppositely disposed cone members mounted on and adapted for axial movement relative to said shaft, each of said cone members mounting a plurality of angularly disposed pins, said pins being circumferentially spaced around each of the respective of said cone members, and each of said pins being disposed for movement through the passageway means provided in the support member of the respective of said segment assemblies for radially collapsing and expanding movement of the segment assemblies upon axial movement of the cone members toward and away from one another.

5. A collapsible tire building drum in accordance with claim 4 wherein alternate of the pins of each of the respective of said cone members are disposed at an angle different from the angle of the other of said pins for moving certain of said segment assemblies radially in advance of other of said segment assemblies upon collapsing of the drum, and for moving said others of the segment assemblies radially in advance of first mentioned said segment assemblies upon expanding of the drum.

6. A collapsible tire building drum in accordance with claim 4 including an oppositely threaded screw disposed for turning movement through said shaft, a pair of nuts mounted for threaded movement on said screw, one of said nuts operably connected to one of said cone members and the other of said nuts operably connected to the other of said cone members for moving the cone members axially toward and away from one another upon turning movement of said screw.

7. A collapsible tire building drum in accordance with claim 4, including a drive member disposed for reciprocable movement within said shaft and operably connected to one of said cone members, a pair of rack members, one of said rack members connected at one end to one of said cone members and the other rack member connected at the opposite end to the other of said cone members, and gear means mounted within said shaft and adapted for coacting meshing engagement with said rack members for moving said cone members axially toward and away from one another upon reciprocable movement of said drive member.

8. A collapsible tire building drum comprising, a plurality of segment assemblies arranged to form a continuous tire building surface, a shaft spaced within said segment assemblies adapted for rotating said drum, a pair of spaced oppositely disposed cone members mounted on and adapted for axial movement relative to said shaft, a plurality of angularly disposed pins mounted on and in circumferentially spaced relationship around each of said cone members, said segment assemblies being slideably mounted on said pins for radial collapsing and expanding movement upon axial movement of said cone members toward and away from one another, an elongated screw means disposed for turning movement within said shaft, and nut means movable on said screw means and operably connected to said cone members for moving the latter axially of said shaft upon turning movement of said screw means.

9. A collapsible tire building drum in accordance with claim 8, wherein alternate of said pins are disposed at an angle different from the other of said pins for moving certain of said segment assemblies radially in advance of other of said segment assemblies upon collapsing of the drum, and for moving said others of the segment assemblies radially in advance of the first mentioned segment assemblies upon expanding of the drum.

10. A collapsible tire building drum comprising, a set of larger segment assemblies and an alternately disposed set of smaller segment assemblies arranged to form a continuous tire building surface, each of said segment assemblies including a pair of spaced, oppositely disposed arms extending inwardly therefrom and having an inclined passageway adjacent the free end thereof, a shaft spaced within said segment assemblies and adapted for rotating said drum, a pair of spaced, oppositely disposed cone members mounted on and adapted for axial movement relative to said shaft, each of said cone members mounting a plurality of circumferentially spaced, angularly disposed pins, and certain of the pins of each of said cone members being slideably movable through the passageways provided in the arms of the larger segment assemblies and others of the pins of each of said cone members being slideably movable through the passageways provided in the arms of the smaller segment assemblies for radially collapsing and expanding movement of said segment assemblies upon axial movement of the cone members toward and away from one another.

11. A collapsible tire building drum in accordance with claim 10, wherein the pins mounting said larger segment assemblies are disposed at a lesser angle than the pins mounting said smaller segment assemblies for moving said smaller segment assemblies radially in advance of said larger segment assemblies upon collapsing of the drum.

12. A collapsible tire building drum in accordance with claim 11, including an elongated screw means disposed within said shaft, a pair of nuts mounted for movement on said screw means, one of said nuts operably connected to one of said cone members and the other of said nuts operably connected to the other of said cone members for moving the cone members axially toward and away from one another upon actuation of said screw means.

13. A collapsible tire building drum in accordance with claim 12, wherein said screw means comprises an elongated, oppositely threaded screw journaled at one end within said shaft and connected at its other end to a power source, and a bearing means disposed within said shaft for journaling said screw intermediate its ends thereof.

14. A collapsible tire building drum in accordance with claim 11, including a drive member disposed for reciprocable movement within said shaft and operably connected to one of said cone members, a pair of toothed rack members, one of said rack members operably connected at one end to one of said cone members and the other of said rack members operably connected to the other of said cone members, and gear means mounted within said shaft and adapted for coacting engagement with said rack members for moving said cone members axially toward and away from one another upon actuation of said drive member.

15. A collapsible tire building drum in accordance with claim 14, wherein said gear means includes a pair of spaced pinion gears disposed in tandem alignment, said pinion gears being mounted for free rotation within said shaft and adapted for meshing engagement intermediate said rack members.

References Cited
UNITED STATES PATENTS

| | | | |
|---|---|---|---|
| 1,903,202 | 3/1933 | Stevens | 156—418 |
| 2,123,586 | 7/1938 | Heston | 156—418 |
| 2,558,684 | 6/1951 | Haase | 156—418 |
| 3,002,875 | 10/1961 | Trevaskis | 156—417 |

EARL M. BERGERT, *Primary Examiner.*

HAROLD ANSHER, *Assistant Examiner.*